Jan. 5, 1943.  J. S. CEBIK  2,307,019
COOLANT CONTROL FOR CUT-OFF MACHINES
Filed March 22, 1941  2 Sheets-Sheet 1

INVENTOR
James S. Cebik
BY
Wooster & Davis
ATTORNEYS

Jan. 5, 1943.    J. S. CEBIK    2,307,019
COOLANT CONTROL FOR CUT-OFF MACHINES
Filed March 22, 1941    2 Sheets-Sheet 2

INVENTOR
James S. Cebik
BY
Wooster Davis
ATTORNEYS.

Patented Jan. 5, 1943

2,307,019

UNITED STATES PATENT OFFICE 2,307,019

COOLANT CONTROL FOR CUTOFF MACHINES

James S. Cebik, Devon, Conn., assignor to The Bridgeport Safety Emery Wheel Company, Inc., Stratford, Conn., a corporation of Connecticut Application March 22, 1941, Serial No. 384,722

9 Claims. (Cl. 51—267)

This invention relates to cut-off machines, and more particularly to a coolant control for this type of machine, and has for an object to provide a simple and effective means in a cut-off machine, in which there is a cut-off device movable toward and from the work, operable by these movements to turn on and cut off the coolant supply at certain points in these movements.

It is a further object to provide in connection with such cut-off devices a control means which will reduce the time lost in changing and setting the work, in which the work can be more easily and accurately located, and the operations carried out with greater safety and less discomfort to the operator. Another object is to reduce waste of coolant, and to insure there is always coolant on the cut-off device and work during the cutting operation to protect both the work and the cut-off device.

With the foregoing and other objects in view I have devised the construction and arrangement illustrated in the accompanying drawings forming a part of this specification. It is however to be understood that I am not limited to the specific details and arrangement shown, but may employ various changes and modifications within the scope of the invention.

In these drawings:

Fig. 2 is a vertical section through one form of control valve which may be used.

Figure 1:
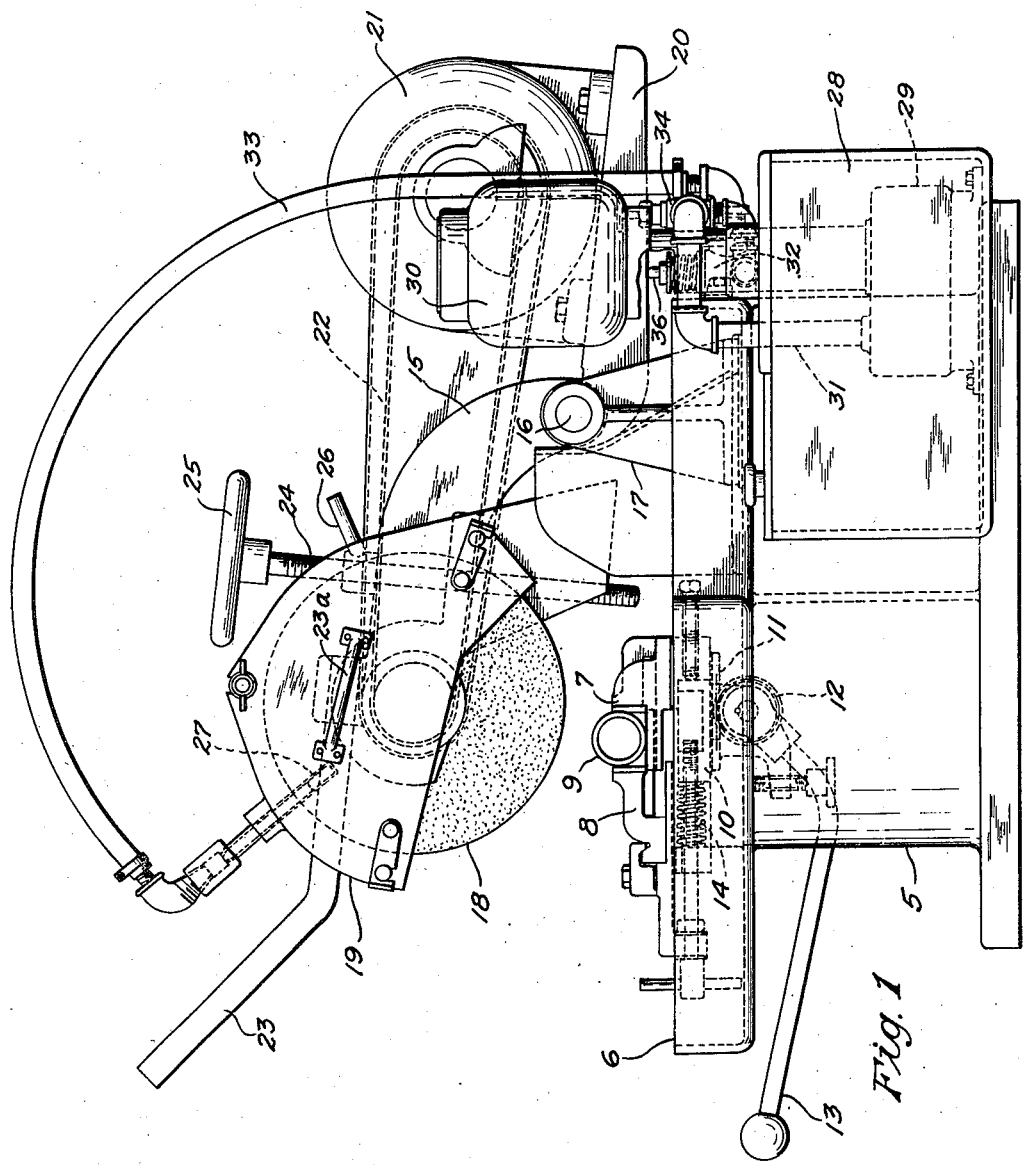
Fig. 1 is a side elevation of a cut-off machine embodying my invention, certain parts being broken away to more clearly show the construction.
Figure 2:
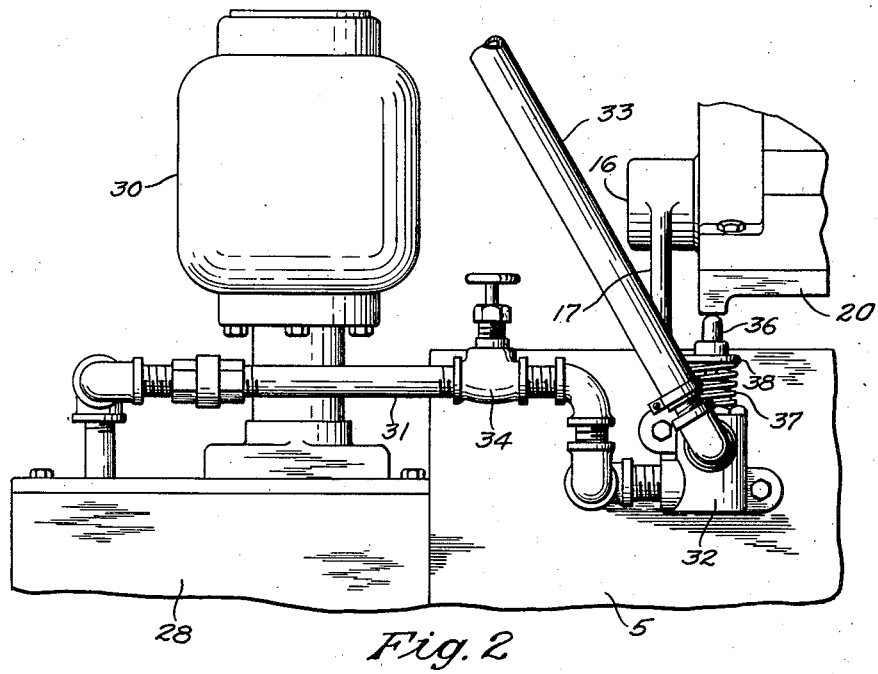
Fig. 2 is an elevation of a portion of the machine looking from the right of Fig. 1 and on a somewhat larger scale.
Figure 3:
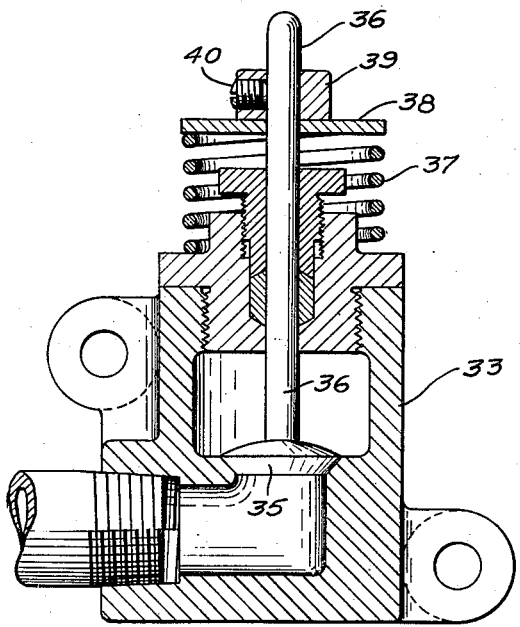

The cut-off machine shown comprises a bed or base 5 having at its upper portion a trough or table 6 in which is mounted a support or holder for the work, in this case comprising a jaw 7 and a movable jaw 8. The work 9, shown for illustration as a tubular piece, is clamped between the jaws 7 and 8 in position for the cut-off operation. Various arrangements may be employed for shifting one of the jaws to clamp and release the work, in the present case the jaw 8 being mounted on a movable carrier 10 slidable on suitable guiding means and having a rack 11 meshing with a gear or pinion 12 operable by a handle 13, so that depression of the handle 13 will operate the gear 12 which, through the rack 11, shifts the carrier 10 and jaw 8 away from the work. A spring 14 may be employed to shift the jaw toward the work and clamp it in position.

Pivotally mounted on the base is a frame or support 15, pivoted at 16 on suitable brackets 17 to swing about a horizontal axis. This frame or support carries a cut-off device 18 which may be a saw or an abrasive wheel, in the present it being shown as an abrasive wheel, the upper portion of which is enclosed and protected by a suitable guard or housing 19 leaving the lower portion of the wheel exposed. On the opposite side of the pivot 16 and mounted on the rearwardly extending portion 20 of the support 15 is an electric motor 21 for driving the wheel 18 by any suitable means such as the belt 22. This motor counterbalances the wheel and its enclosing housing or guard so that the device intends to move to the retracted or inoperative position shown in Fig. 1. One or more handles 23 are connected to the support 15 or housing 19 for swinging the cut-off device toward and from the work and controlling its movements. A limit stop comprising an adjustable screw 24 is carried by this support to engage a suitable stop on the bed to limit downward movement of the cut-off device. A suitable hand wheel 25 may be provided to adjust this screw, and it may be locked in adjusted positions by a suitable lock nut or clamp 26.

Located in the housing or guard 19 so as to move with the cut-off device are one or more discharge nozzles 27 for coolant. These are located so as to discharge the coolant directly on the cut-off device or wheel 18, preferably on the opposite sides thereof so that it is carried on the surfaces of the wheel and by centrifugal action directly to the point at which the cutting operation is taking place so as to protect both the cut-off wheel and the work being cut from injury by overheating or burning. The coolant collects in the trough or table 6 and is carried therefrom to a suitable sump or container 28. Connected with or mounted in this container is any suitable type of pump 29 operated by a motor 30 and from which leads a discharge pipe 31 to a shut-off valve 32 which is connected by a flexible connection or hose 33 with the nozzles 27. There may also be located in the pipe 31 a hand controlled valve 34 for controlling the rate of flow of coolant or for cutting it off by hand if desired.

The shut-off valve 32 includes a valve member 35 operable by a suitable stem 36 projecting at its free end from the body or casing of the valve and located under or in the path of movement of the rearward extension 20 of the support 15 so as to be engaged by this extension and depress the valve and move it to the closed or cut-off position as the frame 15 moves to the limit of its backward movement when the cut-off device 18 has been moved away from the work. Associated with the valve stem 36 is a spring 37 reacting against a plate 38 to tend to lift the valve from its seat to permit flow of coolant through the flexible connection 33 to the nozzles 27. The collar 39 forms an abutment for the disc 38 and may be secured in different positions on the valve stem by a set screw 40.

It will be seen from the above that when the frame 15 is in the normal or inoperative position of Fig. 1, that is, with the cut-off device 18 raised from the work, the extension 20 of this support engages the valve stem 36 to depress the valve 35 and hold it against its seat to cut off flow of coolant to the nozzles 27 and to the cut off device and work. When the support or frame 15 is swung from this position about the pivot 16, in shifting the cut-off device 18 toward the work, the valve 35 is released, permitting the spring 37 and pressure of coolant on the valve to raise the valve from its seat and permit flow of coolant through the flexible connection 33 to the nozzles 27 for discharge onto the cut-off wheel and the work. The coolant may be of any suitable or ordinary liquid coolant, usually water with a certain amount of oil to keep the work from rusting.

It will thus be evident that after setting the work, when the operator shifts the cut-out device toward the work, always at a certain point in this movement the coolant is automatically fed to the cut-off device, and it can be so regulated as to insure that this coolant is also discharged on the cut-off device and the work before the cut-off device touches the work or the cutting off operation begins, and without any operation being required by the operator other than that of shifting the cut-off device toward the work. Similarly after the cutting off operation is completed and the cut-off device is raised or moved away from the work the flow of coolant to the cut-off device and work is automatically shut off just before the cut-off device and frame 15 reaches the limit of its backward movement. It will thus be seen that the supply of coolant is never shut off until the cutting-off operation is completed and the cut-off device is moved well away from contact with the work. It will also be seen that the turning on and shutting off of flow of coolant is controlled by movement of the frame 15 and therefore by movement of the cut-off device toward and from the work, and they each occur always at the same point in these movements without any separate operation on the part of the operator or any conscious act which he must perform outside of the mere act of moving the cut-off device to and from the work.

This has a number of very material advantages. It reduces the time lost between the cutting-off operations, as the operator does not have to perform the separate acts of shutting off and turning on the coolant. It also obviates the necessity of the operator working with his hands in the coolant. It thus reduces discomfort and facilitates proper and more accurate location of the work as there is nothing to interfere with the actions of the operator or to interfere with the visibility, and by eliminating separate operations it saves time and increases production. It also increases safety and reduces liability of injury as the operator can see the work and what he is doing or, that is, he can actually see the work and the wheel, which makes it much easier to locate the work and insures it being properly located, and it prevents loss of time in groping for work under the water. Furthermore it prevents waste of coolant and there is no danger of the operator forgetting or failing to shut it off at the end of the operation. A very important result is that it always insures that coolant is on the cut-off device and the work before this cut-off device touches the work, so that it insures that neither the work nor the wheel is burned or overheated by a dry wheel, which might happen with hand control. Furthermore it prevents shutting off of the coolant before the cut-off device leaves the work. In short, this control always starts the flow of coolant at the same time or same predetermined position in the movement of the cut-off device toward the work, and insures that it is not cut off until after the cutting operation has been completed and the cut-off device moved away from the work. There is, therefore, secured a full and complete control and maximum efficiency of coolant, as contrasted with hand control where the operator might fail to start the flow of coolant until after actual contact of the cut-off device with the work, and when he does that he gets inefficient cutting and might injure the work or wheel, or both, and cause part of cut to burn.

Having thus set forth the nature of my invention, what I claim is:

1. In a device of the character described, a holder for work to be cut, a cut-off device movable toward and from the work, a movable support for said device, a nozzle movable with said device for delivering liquid coolant to said cut-off device, a pump, a conduit leading from the pump to said nozzle, a shut-off valve controlling flow of coolant from the pump to the nozzle, and means extending into the path of movement of said support as it moves to carry the cut-off device away from the work and arranged to be engaged by said support to close the valve after the cut-off device leaves the work.

2. In a device of the character described, a holder for work to be cut, a cut-off device movable toward and from the work, a movable support for said device, means for delivering a liquid coolant to said cut-off device, a shut-off valve for starting and stopping flow of coolant to said device, and means extending into the path of movement of said support as it moves to carry the cut-off device away from the work and arranged to be engaged by said support to close the valve after the cut-off device leaves the work.

3. In a device of the character described, a holder for work to be cut, a pivoted support, a cut-off device mounted on said support for movement toward and from the work by turning of the support on the pivot, means for delivering a liquid coolant to said device, a shut-off valve for said coolant and means extending into the path of movement of said support as it moves to carry the cut-off device away from the work and arranged to be engaged by said support to close the valve after the cut-off device leaves the work.

4. In a device of the character described, a holder for work to be cut, a pivoted support, a cut-off device mounted on said support for movement toward and from the work by turning of the support on the pivot, a discharge nozzle mounted on said support for movement with said device, a pump, a conduit leading from the pump to said nozzle, a shut-off valve controlling flow of liquid to said device, and means extending into the path of movement of said support as it moves to carry the cut-off device away from the work and arranged to be engaged by said support to close the valve after the cut-off device leaves the work.

5. In a device of the character described, a holder for work to be cut, a pivoted support, a cut-off device mounted on said support for movement toward and from the work by turning of the support on the pivot, means for delivering a liquid coolant to said device, a shut-off valve for said coolant including a body and a stem projecting from the body, a spring tending to shift said stem to open the valve, and said stem being located in a position to be engaged by said support toward the end of its movement as the cut-off device moves from the work to shift the valve to closed position.

6. In a machine of the character described, a bed, a holder for work to be cut, a support pivoted on said bed, a cut-off device mounted on said support for movement toward and from the work by turning of the support on the pivot, a nozzle movable with said device for supplying liquid coolant thereto, a container for coolant, a pump connected with said container, a conduit between the pump and said nozzle, a shut-off valve for controlling flow of liquid from the pump to the nozzle, a spring tending to open the valve, and means extending into the path of movement of the support to be engaged thereby to close the valve during movement of the cut-off device away from the work.

7. In a machine of the character described, a holder for work to be cut, a support pivoted intermediate its length, a cut-off device mounted on said support at one side of its pivot for movement toward and from the work by swinging of the support on its pivot, a motor mounted on the support on the other side of the pivot, driving means from the motor to said device, a nozzle movable with said device for supplying liquid coolant thereto, a pump, a conduit leading from the pump to said device, a shut-off valve for controlling flow of liquid from the pump to the nozzle, and means controlled by movement of said support for opening and closing said valve at predetermined positions in the movement of said support.

8. In a device of the character described, a holder for work to be cut, a pivoted support, a cut-off device mounted on said support for movement toward and from the work by turning of the support on the pivot, means for delivering liquid coolant to said device, a shut off valve for said coolant, a spring tending to open the valve, and means extending into the path of movement of the support to be engaged thereby to close the valve during movement of the cut-off device away from the work and located to cut off the coolant only after the cut-off device leaves the work.

9. In a device of the character described, a holder for work to be cut, a pivoted support, a cut-off device mounted on said support for movement toward and from the work by turning of the support on the pivot, means for delivering liquid coolant to said device, a shut off valve for said coolant, means controlled by movement of said support for opening the valve as the cut-off device moves toward the work, and means extending into the path of movement of the support to be engaged thereby toward the end of its movement to cause closing of the valve during movement of the cut-off device away from the work.

JAMES S. CEBIK.